United States Patent
Leff et al.

(10) Patent No.: US 7,958,105 B2
(45) Date of Patent: Jun. 7, 2011

(54) SYSTEM AND METHOD FOR FILTERING DATABASE RESULTS USING DYNAMIC COMPOSITE QUERIES

(75) Inventors: Avraham Leff, Spring Valley, NY (US); James T. Rayfield, Ridgefield, CT (US); Timo J. Salo, Cary, NC (US); Brandon J. W. Smith, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 12/044,395

(22) Filed: Mar. 7, 2008

(65) Prior Publication Data
US 2009/0228440 A1    Sep. 10, 2009

(51) Int. Cl.
*G06F 17/30*    (2006.01)
(52) U.S. Cl. ......... 707/706; 707/713; 707/781; 713/201
(58) Field of Classification Search .................. 707/609, 707/625, 694, 706, 713, 781; 709/203; 713/201
See application file for complete search history.

(56) References Cited

U.S. PATENT DOCUMENTS

| | | | |
|---|---|---|---|
| 6,236,996 B1 * | 5/2001 | Bapat et al. ........................... 1/1 |
| 6,279,111 B1 * | 8/2001 | Jensenworth et al. .......... 726/10 |
| 6,356,887 B1 * | 3/2002 | Berenson et al. ..................... 1/1 |
| 6,516,337 B1 | 2/2003 | Tripp et al. ................... 709/202 |
| 6,757,670 B1 * | 6/2004 | Inohara et al. ....................... 1/1 |
| 6,820,082 B1 * | 11/2004 | Cook et al. .......................... 1/1 |
| 6,842,758 B1 | 1/2005 | Bogrett ..................... 707/103 R |
| 6,952,666 B1 * | 10/2005 | Weise ................................ 704/9 |
| 7,017,188 B1 | 3/2006 | Schmeidler et al. ............ 726/26 |
| 7,142,840 B1 * | 11/2006 | Geddes et al. ................. 455/411 |
| 7,234,112 B1 * | 6/2007 | Brown et al. .................. 715/713 |
| 7,624,388 B2 * | 11/2009 | Hsieh et al. .................... 717/154 |
| 7,661,141 B2 * | 2/2010 | Dutta et al. ...................... 726/26 |
| 7,734,886 B1 * | 6/2010 | Van Riel et al. .............. 711/163 |
| 7,877,330 B2 * | 1/2011 | Siegel et al. .................... 705/57 |
| 2002/0078023 A1 | 6/2002 | Lawton ............................. 707/1 |
| 2003/0169284 A1 * | 9/2003 | Dettinger et al. ............. 345/708 |
| 2004/0039736 A1 * | 2/2004 | Kilmer et al. ..................... 707/3 |
| 2004/0054916 A1 * | 3/2004 | Foster et al. .................. 713/200 |
| 2004/0078374 A1 * | 4/2004 | Hamilton ........................ 707/10 |
| 2004/0093332 A1 * | 5/2004 | Hrle ................................. 707/3 |
| 2004/0181679 A1 * | 9/2004 | Dettinger et al. ............. 713/193 |
| 2005/0022029 A1 * | 1/2005 | Potter et al. .................... 713/201 |
| 2005/0131877 A1 | 6/2005 | Ghosh et al. ...................... 707/3 |
| 2005/0216451 A1 * | 9/2005 | Enzler et al. ...................... 707/3 |
| 2006/0074934 A1 * | 4/2006 | Dettinger et al. ............. 707/100 |
| 2006/0225132 A1 * | 10/2006 | Swift et al. ...................... 726/11 |

(Continued)

*Primary Examiner* — Hanh B Thai
(74) *Attorney, Agent, or Firm* — Ido Tuchman; William J. Stock (57) ABSTRACT

A method, system and computer program product for retrieving data records to a client computer. An identifier of a base query is received from the client computer. The base query is configured to select a set of data records from a database that the client computer has permission to access. A modifying clause is also received from the client computer. The modifying clause comprises a directive restricting the set of data records to a subset of data records. The modifying clause may optionally comprise an expression for sorting. A combined query is generated from the base query and the modifying clause. The query is configured to return the subset of data records. The combined query is further configured to sort the subset of data records based on the value of the expression if the expression is present. The combined query is executed at the database.

20 Claims, 4 Drawing Sheets

U.S. PATENT DOCUMENTS

| | | | |
|---|---|---|---|
| 2007/0073664 A1* | 3/2007 | Ahn | 707/3 |
| 2007/0136603 A1* | 6/2007 | Kuecuekyan | 713/185 |
| 2007/0186106 A1* | 8/2007 | Ting et al. | 713/168 |
| 2007/0240048 A1 | 10/2007 | Piaseczny et al. | 715/700 |
| 2007/0260636 A1 | 11/2007 | Baio et al. | 707/104.1 |
| 2008/0028436 A1* | 1/2008 | Hannel et al. | 726/1 |
| 2008/0077997 A1* | 3/2008 | Miyata et al. | 726/28 |
| 2008/0097962 A1* | 4/2008 | Santosuosso | 707/2 |
| 2008/0104418 A1* | 5/2008 | Parnell | 713/193 |
| 2008/0147602 A1* | 6/2008 | Anderson et al. | 707/3 |
| 2008/0172366 A1* | 7/2008 | Hannel et al. | 707/3 |
| 2008/0243853 A1* | 10/2008 | Reding et al. | 707/9 |
| 2008/0254766 A1* | 10/2008 | Craven | 455/407 |
| 2010/0250937 A1* | 9/2010 | Blomquist et al. | 713/170 |

* cited by examiner

SYSTEM AND METHOD FOR FILTERING DATABASE RESULTS USING DYNAMIC COMPOSITE QUERIES

FIELD OF THE INVENTION

The present invention relates generally to databases. More specifically, the present invention relates to improved techniques for facilitating robust and dynamic filtering and sorting in queries submitted to a database while maintaining the security of data stored at the database.

BACKGROUND

Traditionally, World Wide Web (WWW) sites were accessed via discrete requests. To request a web page, a web browser would transmit a Hypertext Transfer Protocol (HTTP) request to a web server. The request would be processed mostly or entirely at the server. The server would then transmit Hypertext Markup Language (HTML) code representing a complete web page to the web browser. Because processing was performed primarily at the server, enterprise data assets were mostly hidden under this paradigm.

Currently, a paradigm known in the art as Web 2.0 is becoming increasingly common. Diverse motivations drive the adoption of Web 2.0. Web 2.0 sites typically have better latency than traditional web sites. Moreover, Web 2.0 enables more flexible application architectures such as "mashups."

Web 2.0 frequently involves increased interaction between the web browser or other client and the web server. Therefore, Web 2.0 sites typically perform more processing at the client than traditional web sites. For this reason, enterprise data assets are more directly exposed for typical Web 2.0 sites than for traditional web sites. However, direct access to enterprise data assets by an untrusted client is clearly unacceptable for security reasons. In fact, it is frequently unacceptable to even allow untrusted clients read-only access to a database. Even schema information for a database, such as the names of columns, may be sensitive.

Clearly, there exists a need to ensure the security of enterprise data assets while providing robust query functionality which effectively and efficiently fulfills the needs of applications for data.

SUMMARY OF THE INVENTION

The present invention addresses the above-mentioned limitations of the prior art by introducing improved techniques for retrieving data records to a client computer. One or more base queries are predefined. Each base query is configured to select a set of data records which are authorized for reading by the client computer. The client computer selects one of the predefined base queries. The client computer additionally specifies a modifying clause comprising a directive restricting a set of data records to a subset of data records. Only those data records conforming to both the base query and the modifying clause may be returned. Thus, security is assured because only data records matched by a base query may be returned. Simultaneously, dynamic, flexible and efficient filtering is facilitated by the modifying clause.

Thus, one exemplary aspect of the present invention is a method for retrieving data records to a client computer. The method comprises receiving an identifier of a base query from the client computer. The base query is configured to select a set of data records from a database that the client computer has permission to access. The method further comprises receiving a modifying clause from the client computer. The modifying clause comprises a directive restricting the set of data records to a subset of data records. The method further comprises generating a combined query from the base query and the modifying clause. The query is configured to return the subset of data records. The method further comprises executing the combined query at the database.

Another exemplary aspect of the present invention is a system for retrieving data records to a client computer. The system comprises a server and a database. The server comprises a receiving unit configured to receive an identifier of a base query from the client computer. The base query is configured to select a set of data records from a database that the client computer has permission to access. The receiving unit is further configured to receive a modifying clause from the client computer. The modifying clause comprises a directive restricting the set of data records to a subset of data records. The server further comprises a generating unit configured to generate a combined query from the base query and the modifying clause. The query is configured to return the subset of data records. The database is configured to execute the combined query.

Another exemplary aspect of the present invention is a computer program product embodied in computer readable memory comprising computer readable program codes coupled to the computer readable memory for retrieving data records to a client computer. The computer readable program codes are configured to cause the program to receive an identifier of a base query from the client computer. The base query is configured to select a set of data records from a database that the client computer has permission to access. The computer readable program codes are further configured to receive a modifying clause from the client computer. The modifying clause comprises a directive restricting the set of data records to a subset of data records. The computer readable program codes are further configured to generate a combined query from the base query and the modifying clause. The query is configured to return the subset of data records. The computer readable program codes are further configured to execute the combined query at the database.

The foregoing and other features, utilities and advantages of the invention will be apparent from the following more particular description of various embodiments of the invention as illustrated in the accompanying drawings.

DETAILED DESCRIPTION OF THE INVENTION

The following description details how the present invention is employed to retrieve data records to a client computer. Throughout the description of the invention reference is made to FIGS. 1-4. When referring to the figures, like structures and elements shown throughout are indicated with like reference numerals.

Figure 1:
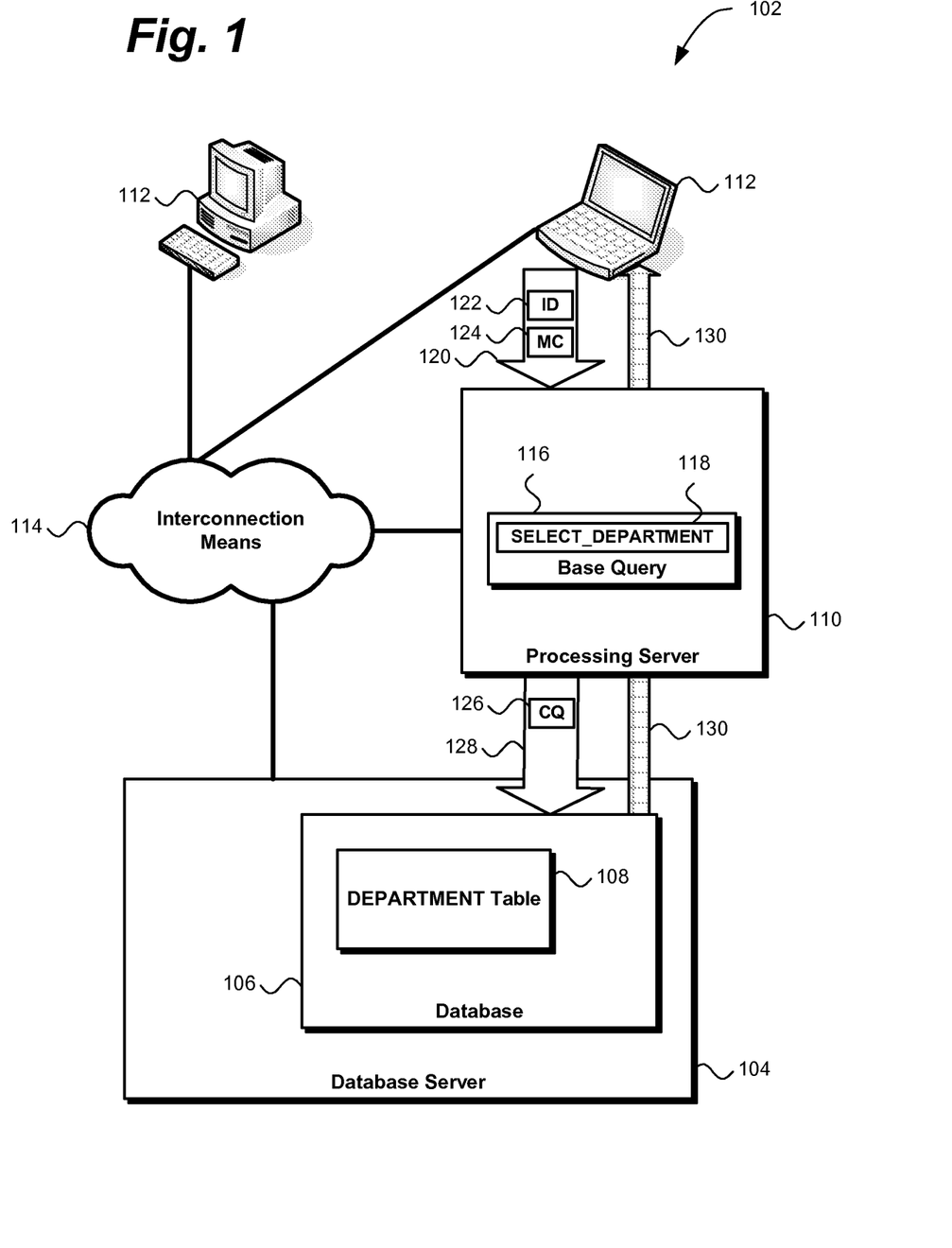
FIG. 1 shows an exemplary system for retrieving data records to a client computer, the system embodying the present invention.

FIG. 1 shows an exemplary system 102 for retrieving data records to a client computer, the system embodying the present invention. The system may be configured to achieve any of a variety of goals.

The system 102 includes a database server 104. The database server may be a general purpose computer. The database server may incorporate any of a wide variety of architectures, operating systems and computer program products. The database server may be based on a general purpose operating system such as the IBM® z/OS® operating system, the IBM AIX® operating system, the Linux® operating system or the Windows® operating system. IBM, z/OS and AIX are registered trademarks of International Business Machines Corporation, Armonk, N.Y., United States in the United States, other countries, or both. Linux® is the registered trademark of Linus Torvalds in the United States and other countries. Windows is a registered trademark of Microsoft Corporation, Redmond, Wash., United States, in the United States and/or other countries. The database server may be connected to a variety of peripheral devices known in the art, including a keyboard, a mouse, a display and one or more disk drives. It is emphasized that while the exemplary system of FIG. 1 includes only one database server, a system implementing the present invention may include a potentially unlimited number of database servers.

The database server 104 includes a database 106. The database may be any of a variety of systems configured to manage data. The database may be a computer program product such as the IBM® DB2® database or the MySQL® database. DB2 is a registered trademark of International Business Machines Corporation, Armonk, N.Y., United States, in the United States, other countries, or both. MySQL is a registered trademark of MySQL AB, Uppsala, Sweden in the United States, the European Union and other countries. A large quantity of data may be stored at the database. It is emphasized that while the exemplary database server of FIG. 1 includes only one database, a database server may include a potentially unlimited number of databases.

Notably, the database 106 is configured to receive queries specifying criteria for matching data. In response to queries thus received, the database is configured to select, from the data located at the database, all data which matches the criteria specified by the query. The database is further configured to transmit the selected data to the entity which submitted the query.

In an embodiment of the present invention, the database 106 is a relational database. A relational database includes zero or more tables 108. Each table includes zero or more records, each of which includes one or more fields. Generally, all records within a table include the same fields, although the values contained within the fields vary from record to record. It is noted that records may also be referred to as tuples or rows, and fields may also be referred to as columns. A relational database may be queried using a programming language known as Structured Query Language, or SQL. SQL is designed specifically to facilitate selecting data from, and managing data located at, relational databases.

It is emphasized that the present invention may be implemented for databases which are not relational in nature. In another embodiment of the present invention, the database 106 is a hierarchical database. In another embodiment of the present invention, the database is an object-oriented database. The database may also be of another paradigm not listed herein.

The database may process queries expressed in any of a variety of query languages known in the art. Such query languages may include SQL, Extensible Markup Language™ (XML™), Atom and JavaScript™ Object Notation (JSON). Extensible Markup Language and XML are trademarks (registered in numerous countries) of the World Wide Web Consortium; marks of W3C are registered and held by its host institutions MIT, ERCIM, and Keio. JavaScript is a trademark of Sun Microsystems, Inc., Santa Clara, Calif., United States, in the United States and other countries.

The exemplary database 106 shown in FIG. 1 includes a table 108 named "DEPARTMENT". Each record in the DEPARTMENT table represents, and contains data relating to, an employee in a certain department of a business corporation. The table (and thus, each record) has several fields. A field named "DEPTNO" contains the office number of the employee. A field named "DEPTNAME" contains the full name of the employee. A field named "MANAGER" contains the last name or surname of the employee's manager.

It is noted that the exemplary table 108 described above is intentionally devoid of detail which is not essential for illustrating the present invention. Those skilled in the art will appreciate that databases frequently contain numerous tables. Databases may additionally contain structures other than tables, such as indexes, foreign keys, stored procedures and triggers. It is emphasized that the present invention may be employed to query databases including numerous tables and/ or structures such as those listed above.

The system 102 further includes a processing server 110. The processing server may be an application server. The processing server may be a general purpose computer. Furthermore, the processing server may incorporate any of a wide variety of architectures, operating systems and computer program products. In a particular embodiment of the invention, the processing server is based on a general purpose operating system such as the IBM z/OS operating system, the IBM AIX operating system, the Linux operating system or the Windows operating system. The processing server may be connected to a variety of peripheral devices known in the art, including a keyboard, a mouse, a display and one or more disk drives. It is emphasized that while the exemplary system of FIG. 1 includes only one processing server, a system implementing the present invention may include a potentially unlimited number of processing servers.

The processing server 110 may be a web server. Thus, the processing server may include computer program products such as the WebSphere® application server, the Enterprise JavaBeans™ software or a Hypertext Transfer Protocol (HTTP) daemon. WebSphere is a registered trademark of International Business Machines Corporation, Armonk, N.Y., United States, in the United States, other countries, or both. Enterprise JavaBeans is a trademark of Sun Microsystems, Inc., Santa Clara, Calif., United States, in the United States and other countries.

In the exemplary system 102 of FIG. 1, the database 106 is located at a server other than the processing server 110. It is emphasized that the present invention does not require this condition to hold. For example, the database could be located at the processing server.

The system 102 further includes one or more client computers 112. A client computer may be a general purpose computer. A client computer may incorporate any of a wide variety of architectures, operating systems and computer program products. A client computer may be based on a general purpose operating system such as the Windows operating system, the Mac OS® operating system or the Linux operating system. Mac OS is a registered trademark of Apple Inc., Cupertino, Calif., United States. A client computer may be connected to a variety of peripheral devices known in the art, including a keyboard, a mouse, a display and one or more disk drives. A client computer may also be a device other than a general purpose computer, such as a personal digital assistant (PDA) or a mobile telephone.

A client computer 112 may include a web browser. A web browser is a computer program product configured to access the World Wide Web. The web browser may be a computer program product such as the Internet Explorer® browser, the Firefox® browser or the Safari™ browser. Internet Explorer is a registered trademark of Microsoft Corporation, Redmond, Wash., United States, in the United States and/or other countries. Firefox is a registered trademark of the Mozilla Foundation, Mountain View, Calif., United States. Safari is a trademark of Apple Inc., Cupertino, Calif., United States. A web browser may communicate with the processing server 110.

The system 102 further includes an interconnection means 114. The interconnection means may be any of a wide variety of systems known in the art for allowing two or more systems to communicate. The interconnection means may comprise any of a wide variety of networks such as the Internet, the public switched telephone network (PSTN), local area networks (LAN's) and wide area networks (WAN's). The interconnection means may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. The interconnection means may include various topologies and protocols known to those skilled in the art, such as TCP/IP, UDP, and Voice over Internet Protocol (VoIP). The interconnection means may comprise direct physical connections, radio waves, microwaves or any combination thereof. Furthermore, the interconnection means may include various networking devices known to those skilled in the art, such as routers, switches, bridges, repeaters, etc.

The system 102 further includes one or more base queries 116. Each base query is configured to select a set of data records from the database. It is contemplated that each base query has a unique identifier 118 or name by which a user or client computer may invoke the base query. A base query may also be referred to as a labeled SQL statement, an enterprise label or a macro. In the exemplary system of FIG. 1, the base queries are stored at the processing server 110. The base queries may also be stored at another location provided the processing server can access the base queries.

A server administrator may define a base query 116. The administrator may then authorize one or more users or client computers 112 to execute the base query. It is emphasized that this results in the users or client computers thus authorized being granted permission to access to all data matched by the base query.

The base queries may be expressed in any of a variety of query languages known in the art, including SQL, XML, Atom and JSON. In an embodiment of the present invention, the base queries are character strings containing SQL code.

It is contemplated that users and client computers 112 do not possess the ability to edit the base queries 116. Furthermore, it is contemplated that users and client computers do not possess the ability to submit free-form queries, such as arbitrary SQL code, to the database 106. Those skilled in the art will appreciate that free-form queries present a security risk in many situations because they may contain instructions to perform actions which are harmful. Thus, base queries beneficially allow the server administrator to ensure the security of the data stored at the database and to enforce policies specifying which data each user and client computer may access.

Moreover, a user or client computer 112 may not even possess the ability to view the code included in a base query 116. Indeed, a user or client computer may not even be aware of the programming language, e.g., SQL, in which the base query is coded. This may further improve security by hiding details of the database structure which users and client computers do not need to know in order to successfully query the database 106.

To execute a base query, a user or client computer needs to know only the identifier or name of the base query and the fields included in the result set of the base query. Thus, functionality may be provided to allow a user or client computer to request a list of the names of each base query. Such a list may also include the fields included in the result set of each base query.

In the exemplary system of FIG. 1, a server administrator defines a base query 116. The base query has an identifier 118, "SELECT_DEPARTMENT", by which it may be invoked. The SELECT_DEPARTMENT base query is configured to select all fields of all records in the DEPARTMENT table 108. Accordingly, the SELECT_DEPARTMENT base query is a character string containing the SQL code, "SELECT * FROM DEPARTMENT".

The administrator then authorizes all managers in the department to execute the SELECT_DEPARTMENT base query 116. This results in all managers being granted permission to access the set of data records selected by the SELECT_DEPARTMENT base query. Because the SELECT_DEPARTMENT base query selects all data records stored at the DEPARTMENT table 108, all managers have permission to view all data records stored at the DEPARTMENT table (provided this access is achieved via the SELECT_DEPARTMENT base query.)

Suppose a manager named Smith requires information on all employees in the department. To obtain this information, a client computer 112 operated by Smith may transmit to the processing server 110 a request to execute the SELECT_DEPARTMENT base query 116. The request includes the identifier of the base query, namely "SELECT_DEPARTMENT". The processing server receives the request from the client computer. To process the request, the processing server transmits the SQL code included in the SELECT_DEPARTMENT base query to the database 106. The database thus executes the transmitted query. The query thus selects all records in the DEPARTMENT table. The set of data records thus selected are transmitted to the client computer.

Suppose, however, that Smith only requires information on the employees who report to her. This information is a subset of the data returned by the SELECT_DEPARTMENT base query 116. Thus, the method steps described above retrieve the desired records but also retrieve many irrelevant records. Ideally, the irrelevant records should be excluded from the data.

To obtain only the information on employees who report to the manager, the data records selected by the SELECT_DEPARTMENT base query 116 can be filtered at the client computer 112 or the processing server 110. Specifically, the client computer or the processing server can iterate over the selected records, discarding all records for which the MANAGER field does not contain the value "Smith". This approach is clearly suboptimal because the irrelevant records must first be transmitted via the interconnection means and then processed by the client computer or the processing server before being discarded. As a result, processing power and bandwidth requirements are unnecessarily increased. An additional drawback to this approach is that while databases are generally configured to perform this type of filtering, a client computer or processing server may not be. Therefore, the client computer or processing server may filter the records inefficiently, or may not have enough memory to filter the records.

Another method for obtaining only the information on employees who report to the manager is to create an additional base query specifically to retrieve employees having a defined manager. However, drawbacks are associated with creating an additional base query to process every possible type of filtering condition which may be applied to an existing base query. This approach inherently requires a priori knowledge of the specific types of filtering conditions which will be required. In many cases, this knowledge does not exist at the time the base queries are implemented. Indeed, this knowledge cannot exist for queries including dynamic filtering conditions which are not known until runtime. Furthermore, under this approach, the number of base queries may be very large. Managing a large number of base queries is unwieldy from an administrative standpoint. Moreover, many organizations require an approval process before a base query is implemented. For such organizations, increasing the number of base queries increases the overhead required by the approval process, e.g., by requiring numerous additional meetings to be held.

If a user or a client computer 112 has permission to execute a base query 116, the user or client computer has permission to access the entirety of the set of data records selected by the base query. It directly follows that the user or client computer has permission to access a subset of the selected set of data records. It is therefore acceptable from a security and administrative standpoint to transmit any subset of the data records selected by the base query to a user or client computer having permission to execute the base query.

Accordingly, the present invention allows a user or client computer 112 to restrict the set of data records selected by a base query 116 so that only a subset of the data records is returned. To achieve this goal, a user or client computer transmits to the processing server 110 a request 120 to execute a base query. The request includes an identifier 122 of the base query. The request further includes a modifying clause 124 comprising a directive restricting the set of data records to a subset of data records.

The processing server 110 receives the request 120 from the client computer 112. To process the request, the processing server generates a combined query 126 from the base query 116 and the modifying clause 124. The combined query is configured to select data which would be selected by the base query and which additionally conforms to the directive included in the modifying clause. Therefore, two conditions will hold true for data selected by the combined query. The first is that the data would have been returned by the unmodified base query. Therefore, it is evident that the user or client computer has permission to read the selected data. The second is that the data conform to the directive included in the modifying clause. Therefore, it is evident that unwanted or irrelevant data are not selected by the combined query. It is emphasized that as a result, the processing server allows filtering the data selected by a base query.

The combined query 126 is then transmitted 128 to the database 106, where it is executed. It is emphasized that as a result, the database causes the modifying clause 124 to be enforced.

To continue the preceding example, suppose Smith still requires information on the employees who report to her. To retrieve this information, the client computer 112 operated by Smith may transmit to the processing server a request 120 to execute the SELECT_DEPARTMENT base query 116. As before, the request includes the identifier 122, namely "SELECT_DEPARTMENT", of the base query. Additionally, the request includes a modifying clause 124. The modifying clause comprises a directive restricting the set of data records to that subset of the data records for which the MANAGER field contains the value "Smith".

The processing server 110 receives the request from the client computer 112. To process the request, the processing server generates a combined query 126 from the base query 116 and the modifying clause 124. The combined query is configured to return all records in the DEPARTMENT table 108 for which the MANAGER field contains the value "Smith". The combined query is transmitted 128 to the database 106.

The database 106 then executes the combined query 126. The query selects all records in the DEPARTMENT table 108 for which the MANAGER field contains the value "Smith".

The database 106 may then transmit 130 the data records selected by the combined query 126 to the user or client computer 112. The selected data records may be transmitted directly to the client computer 112, as the requested modifying clause has been fully implemented. The selected data records may instead first be transmitted to the processing server 110, which may then retransmit the data records to the client computer.

It is emphasized that as a result of this process, Smith receives the information requested and does not receive any irrelevant information.

Figure 2:
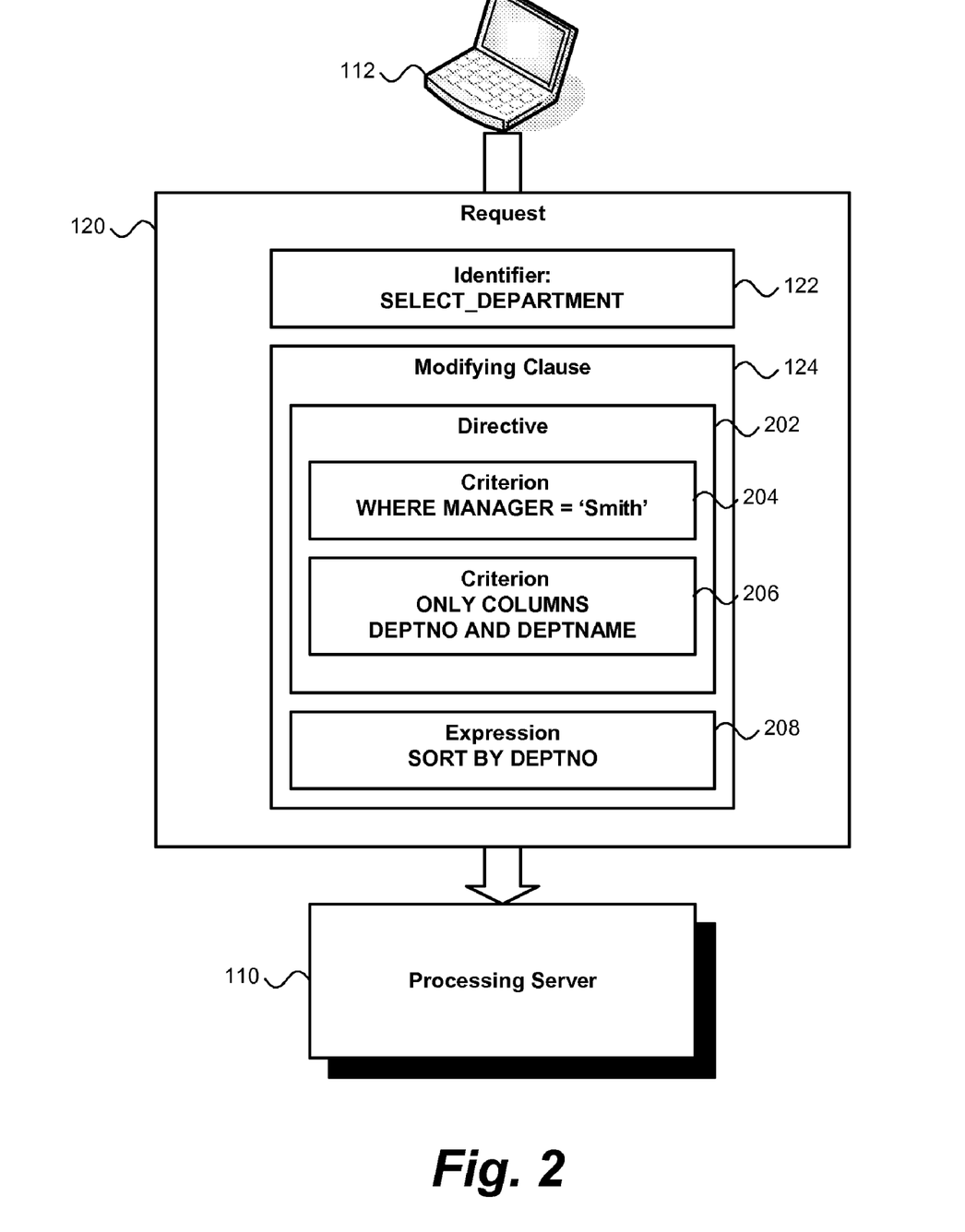
FIG. 2 illustrates additional detail about a request to execute a base query according to the present invention.

Turning now to FIG. 2, additional detail about a request to execute a base query according to the present invention is illustrated. It is noted that the exemplary request shown in FIG. 2 is the same as the exemplary request shown in FIG. 1. Accordingly, FIG. 2 continues the example illustrated in FIG. 1 and adds additional detail thereto.

A client computer 112 transmits a request 120 to the processing server 110. The request specifies that a base query having a specific identifier should be executed at a database that the client computer has permission to access.

The request 120 includes the identifier 122 of the base query. The identifier may be the name of the base query. The name may be a string containing one or more characters. In the exemplary request of FIG. 2, the identifier is "SELECT_DEPARTMENT".

The request 120 may further include a modifying clause 124. The modifying clause comprises a directive 202 restricting the set of data records selected by the base query to a subset of data records. The modifying clause may exist to achieve any of a variety of purposes. For example, the modifying clause may express requirements of the user submitting the request. The modifying clause may also request a specific view of the data returned by the base query.

It is noted that a request 120 may omit the modifying clause 124. This may cause the base query identified by the identifier 112 to be executed at the database without modification.

The system may provide a language in which the modifying clause 124 is expressed, such as a language may be based on a relational algebra. The provided language may be any of a variety of query languages known in the art, including SQL, XML, Atom and JSON. The language may be also a subset of SQL. The language may also be a language other than SQL which incorporates syntax and vocabulary defined in SQL. The language may also be less complex than SQL. In particular, the language may be designed so as to allow expressing only commands which are known not to be harmful.

It is noted that SQL is not fully standardized across database systems known in the art. Thus, the terms Structured Query Language and SQL, as used herein, include all programming languages known in the art implementing a substantial subset of any standard for the Structured Query Language defined by either the American National Standards Institute (ANSI) or the International Standards Organization (ISO).

In a particular embodiment of the invention, the directive 202 is a non-constant. Non-constant, as used herein, means the value of the directive depends on at least one entity external to the directive. A constant numeric value such as "1" is not a non-constant because its value clearly does not depend on any entity external to itself. Similarly, a constant character string value such as "IBM" is not a non-constant because its value likewise does not depend on any entity external to itself. However, a directive such as "WHERE MANAGER='Smith' " is a non-constant because its value depends on the value of a field named MANAGER. This is evident because its value is Boolean True if and only if the MANAGER field, which is clearly external to the directive, equals "Smith". If the MANAGER field equals any other value, the value of the directive is Boolean False.

The directive 202 in the modifying clause 124 may further comprise one or more criteria 204, 206 to be satisfied by the subset of data records.

A criterion 204, 206 may be satisfied only for data records wherein the value of a specific field is equal to a value defined by the criterion. For example, the exemplary criterion 204 contains a fragment of SQL code, "WHERE MANAGER='Smith' ". This criterion is satisfied only for records wherein the MANAGER field is equal to "Smith".

A criterion 204, 206 may also be satisfied only for data records wherein the value of a specific field is within a range defined by the criterion. Such a range may be defined as all values between an upper bound and a lower bound defined by the criterion. A range may also be defined as all values greater than, less than, greater than or equal to, or less than or equal to a value defined by the criterion.

A criterion 204, 206 may also be satisfied only for data records wherein the value of a specific field is an element of a set containing one or more values and defined by the criterion.

A criterion 204, 206 may also specify that only specific records, fields or properties of the query result should be returned. This is advantageous because in many cases, the client computer will utilize only a subset of the records and/or fields returned by the query. Thus, omitting that data which will not be utilized by the client computer reduces processing time and bandwidth requirements.

Specifically, a criterion 204, 206 may be satisfied only for data located at one or more specified fields in a relational data schema. This type of criterion may specify a maximum number of columns to be returned. This type of criterion may also include one or more identifiers of fields to be included in the query result. For example, the exemplary criterion 206 specifies, "ONLY COLUMNS DEPTNO AND DEPTNAME". This criterion is satisfied only for the fields DEPTNO and DEPTNAME. It is noted that because the exemplary criterion 204 is also present, the MANAGER field will be equal to "Smith" in all selected records. Thus, the exemplary criterion beneficially omits the MANAGER field, which is superfluous in this case, from the query result.

Additionally, a criterion 204, 206 in a directive in a modifying clause may be satisfied only for data located at one or more specified records in a relational data schema. This type of criterion may include a parameter named "start". A start parameter contains an integer value. The parameter indicates that a number of records or other data elements equal to the value of the parameter should be located and skipped before any data are returned. For example, if the start parameter is equal to 50, the first 50 records located by the query should be omitted from the query result. The 51st record and any subsequent records should be included in the query result.

This type of criterion may also include a parameter named "count". A count parameter contains an integer value. The parameter indicates that a number of records or other data elements equal to the value of the parameter should be the maximum number of records or data elements returned. For example, if the count parameter is equal to 20, at most 20 records should be returned. If the criterion does not include a start parameter, the first through twentieth records located should be included in the query result, and the 21st record and any subsequent records should be omitted from the query result. The count parameter beneficially allows executing a query which may potentially return a very large quantity of data while ensuring that the amount of data actually returned is manageable.

The same criterion may include both a start parameter and a count parameter. For example, if the start parameter is equal to 50 and the count parameter is equal to 20, only the 51st through 70th records located should be included in the query result. Employing the start and count parameters together beneficially allows pagination of queries returning very large quantities of data.

The modifying clause may further comprise an expression 208 specifying an order in which the query result should be sorted. The expression is a non-constant.

In an embodiment of the present invention, the expression includes one or more identifiers of fields on which the query result should be sorted. For example, the exemplary expression 208 contains "SORT BY DEPTNO". This expression specifies that the result of the query should be sorted on the DEPTNO field in ascending order.

In another embodiment of the present invention, the expression is a parameter named "sort". The sort parameter is an array of JavaScript™ objects. JavaScript is a trademark of Sun Microsystems, Inc., Santa Clara, Calif., United States, in the United States and other countries. Each element of the array has the following format:

```
{
    attribute: attribute || attribute-name-string,
    descending: true|false; // Optional. Default is false.
}
```

In an embodiment of the present invention, the client computer 112 provides a user interface to allow a user to input the modifying clause 124. The user interface may be a graphical user interface (GUI). The user interface includes functionality for inputting a sort order. The sort order input by the user is included in the modifying clause as the "sort" described above. The user interface additionally includes functionality for inputting the "start" and "count" parameters described above. The user interface further provides a window in which the result of the query may be viewed.

Figure 3:
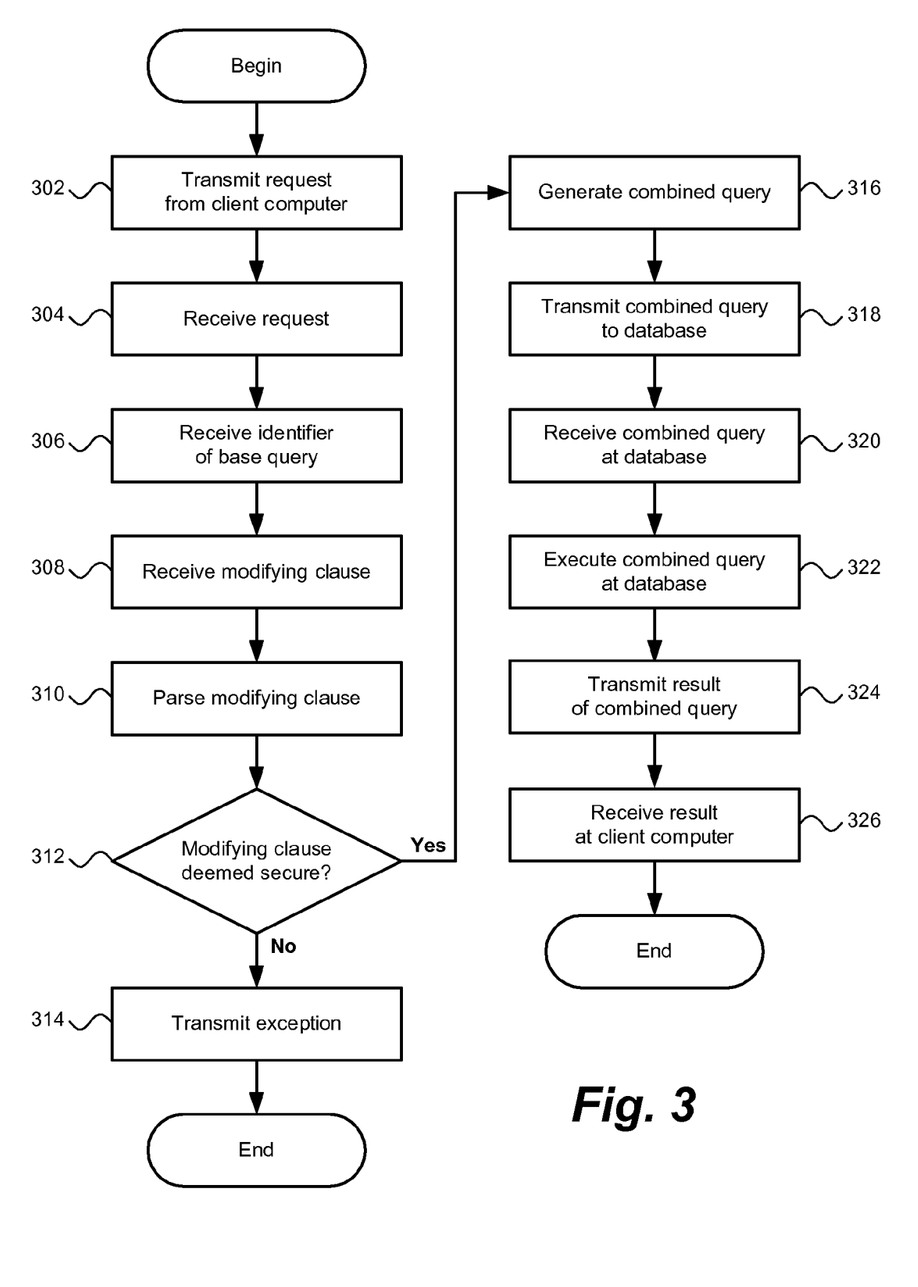
FIG. 3 shows an exemplary flowchart of the operations performed by the present invention to retrieve data records to a client computer.

FIG. 3 shows an exemplary flowchart of the operations performed by the present invention to retrieve data records to a client computer. The operations listed include those performed by a processing server, a database and a client computer such as those shown in FIG. 1. The flowchart is generally arranged in temporal sequence, rather than by system component.

At transmitting operation 302, a client computer transmits a request to a server. The server may be a processing server such as the one shown in FIG. 1. The request may be of the type shown in FIG. 2. Thus, the request may have any or all of the properties discussed in regards to FIG. 2. Notably, the request includes an identifier of a base query. As previously noted, the base query is configured to select a set of data records from a database that the client computer has permission to access. The request may also include a modifying clause comprising a directive restricting the set of data records to a subset of data records.

In the exemplary flowchart of FIG. 3, transmitting operation 302 transmits the exemplary request shown in FIG. 2. Accordingly, FIG. 3 continues the example illustrated in FIGS. 1 and 2 and adds additional detail thereto.

The client computer and the server may communicate according to the Representational State Transfer (REST) protocol. Accordingly, in an embodiment of the present invention, transmitting operation 302 employs a REST application programming interface (API). The client computer constructs a Uniform Resource Locator (URL) which includes a label or identifier specifying a base query. The URL may further include the modifying clause and any other data required to fulfill the request. Accessing the URL causes the request to be transmitted.

The present invention does not require that the client computer and the server communicate according to the REST protocol. The client computer and the server may communicate via the Remote Procedure Call (RPC) technology. The client computer and the server may communicate according to any of a variety of protocols known in the art, including Common Object Request Broker Architecture (CORBA®), Distributed Computing Environment (DCE) and Java™ Remote Method Invocation (Java RMI). CORBA is a registered trademark of Object Management Group, Inc., Needham, Mass., United States, in the United States and/or other countries. Java is a trademark of Sun Microsystems, Inc., Santa Clara, Calif., United States, in the United States and other countries. The client computer and the server may communicate using a variety of data formats known in the art, including XML-RPC and JSON.

At receiving operation 304, the server receives the request from the client computer. After receiving operation 304 is completed, control passes to receiving operation 306.

At receiving operation 306, the server receives the identifier of the base query from the client computer. In the exemplary flowchart of FIG. 3, the identifier of the base query is included in the request received at the server. Therefore, receiving operation 306 comprises extracting the identifier of the base query from the request. After receiving operation 306 is completed, control passes to receiving operation 308.

At receiving operation 308, the server receives the modifying clause from the client computer. In the exemplary flowchart of FIG. 3, the modifying clause is included in the request received at the server. Therefore, receiving operation 308 comprises extracting the modifying clause from the request. Alternatively, if no modifying clause is present, receiving operation 308 may detect that this condition exists. After receiving operation 308 is completed, control passes to parsing operation 310.

At parsing operation 310, the modifying clause is parsed to determine whether its inclusion in the combined query is potentially harmful. Parsing operation 310 may be performed at the server. Parsing operation 310 may process the modifying clause in its entirety. Parsing operation 310 may instead process a subset of the modifying clause, such as a directive.

In an embodiment of the present invention, parsing operation 310 verifies that the modifying clause or a subset thereof contains only computer code which restricts a set of data records to a subset of the data records. For example, if the modifying clause is expressed in SQL, parsing operation 310 may verify that the modifying clause contains only SQL code which is valid in a WHERE clause. The modifying clause is deemed secure if, and only if, only computer code which restricts a set of data records to a subset of the data records is present.

In another embodiment of the present invention, parsing operation 310 searches the modifying clause or a subset thereof for computer code which is known to be potentially harmful. For example, if the modifying clause is expressed in SQL, parsing operation 310 may search for a "DROP TABLE" statement. Those skilled in the art will appreciate that a DROP TABLE statement is a potentially harmful SQL statement specifying that an entire table should be removed from a database. The modifying clause is deemed secure if, and only if, no harmful statements are found.

Parsing operation 310 may include parsing the modifying clause according to a grammar defining a structured syntax and vocabulary. The modifying clause is deemed secure if and only if parsing according to the grammar is successful. In an embodiment of the present invention, the grammar is a Backus-Naur form. The Backus-Naur form may be configured to automate the parsing of SQL code. Such a grammar may include syntax and vocabulary for parsing all valid SQL statements. Such a grammar may instead include only syntax and vocabulary for parsing those SQL statements which are known not to be potentially harmful. For example, the grammar may omit the "DROP TABLE" command which is normally part of the SQL vocabulary. This advantageously causes potentially harmful code to be determined not to be secure because parsing will fail for such code.

If the language for specifying the modifying clause does not include any statements which have potentially harmful results, it is known by construction that the modifying clause does not contain dangerous code. In this case, parsing operation 310 may be omitted. However, if it is not known by construction that the modifying clause does not contain dangerous code, it is contemplated that parsing operation 310 is performed.

After parsing operation 310 is completed, control passes to determining operation 312.

At determining operation 312, it is determined whether the modifying clause was deemed secure at parsing operation 310. Determining operation 312 may be performed at the server. If the modifying clause was deemed secure, control passes to generating operation 316. Otherwise, control passes to exception operation 314.

At exception operation 314, an indication of an exception condition is transmitted to the client computer which transmitted the request at transmitting operation 302. Exception operation 314 may be performed at the server. Processing of the request then terminates, as it is not known that the request can safely be processed.

At generating operation 316, a combined query is generated from the base query and the modifying clause. Generating operation 316 may be performed at the server. The combined query is configured to return the subset of data records specified by the modifying clause.

The processing server may implement the modifying clause using SQL. This may occur even if the modifying clause is not expressed in SQL.

The computer code for the base query corresponding to the identifier received at receiving operation 306 is retrieved. The computer code thus retrieved may be modified as described below.

In an embodiment of the present invention, the code for the base query is included in the combined query in its unaltered form. Additional code is then added to the combined query to implement the modifying clause. This approach beneficially ensures that the client computer cannot receive more information than is revealed by the original base query.

If no modifying clause was received at receiving operation 308, the combined query may simply contain the unmodified code of the base query. The remainder of generating operation 316 as described below can thus be omitted.

If the modifying clause includes a directive comprising a criterion to be satisfied by the subset of data records, the combined query is configured to exclude from the subset of data records any data record for which the criterion is not satisfied.

Thus, if a criterion is satisfied only for data records wherein the value of a specific field is equal to a value defined by the criterion, the combined query is configured to select only records wherein the value of the field is equal to the value defined by the criterion. For example, the exemplary criterion 204 shown in FIG. 2 contains a fragment of SQL code, "WHERE MANAGER='Smith' ". As previously noted, this criterion is satisfied only for records wherein the MANAGER field is equal to "Smith". Therefore, the combined query is configured to select only records wherein the MANAGER field is equal to "Smith".

Moreover, if a criterion is satisfied only for data records wherein the value of a specific field is within a range defined by the criterion, the combined query is configured to select only records wherein the value of the field is within the range defined by the criterion.

Additionally, if a criterion is satisfied only for data records wherein the value of a specific field is an element of a set containing one or more values and defined by the criterion, the combined query is configured to select only records wherein the value of the field is an element of the set defined by the criterion.

Furthermore, if a criterion is satisfied only for data located at one or more specified fields in a relational data schema, the combined query is configured to select only the fields specified by the criterion. For example, the exemplary criterion 206 of FIG. 2 specifies, "ONLY COLUMNS DEPTNO AND DEPTNAME". As previously noted, this criterion is satisfied only for the fields DEPTNO and DEPTNAME. Therefore, the combined query is configured to select only the DEPTNO and DEPTNAME fields.

Additionally, if a criterion is satisfied only for data located at one or more specified records in a relational data schema, the combined query is configured to select only the records specified by the criterion.

As previously noted, this type of criterion may include a parameter named "start". If a start parameter is present, the combined query is configured to locate and skip a number of records or other data elements, the number being equal to the value of the parameter.

This type of criterion may also include a parameter named "count". If a count parameter is present, the combined query is configured to return a number of records or other data elements which is no greater than the value of the parameter.

It is noted that by generating a combined query incorporating both the base query and the restrictions specified by the directive in the modifying clause, the database can combine and optimize the base query and the restrictions together. Therefore, this approach is likely to improve performance relative to executing the base query independently and subsequently executing additional queries to apply the restrictions.

The modifying clause may further comprise an expression 208 specifying an order in which the query result should be sorted. In this case, the combined query is further configured to sort the subset of data records based on the value of the expression. As used herein, the term subset expressly includes an ordered set.

It is noted that databases known in the art are generally configured to sort data efficiently. Therefore, sorting the result of the combined query at the database is advantageous because in general, the database can sort the query result far more efficiently than the client computer.

If the expression includes one or more identifiers of fields on which the query result should be sorted, the combined query is configured to sort the result based on the fields specified by the identifiers. For example, the exemplary expression 208 of FIG. 2 specifies, "SORT BY DEPTNO". As previously noted, this expression specifies that the result of the query should be sorted on the DEPTNO field in ascending order. Therefore, the combined query is configured to sort its result on the DEPTNO field in ascending order.

In an embodiment of the present invention, when sorting in ascending order on a field, a record wherein the field has no value appears in the query result after any record for which the field has a value. Conversely, when sorting in descending order on a field, a record wherein the field has no value appears in the query result before any record for which the field has a value. It is noted that a value of Null may indicate that a field has no value. Null is a construct available in many databases known in the art which indicates that no data are contained in a field.

For example, in response to the exemplary request of FIG. 2, generating operation 316 may begin with the computer code for the base query indicated by the identifier received at receiving operation 306. As previously noted, the exemplary base query contains the SQL code, "SELECT * FROM DEPARTMENT". Generating operation 316 may place the base query in a subquery. The subquery may be renamed to RESULT using the AS statement. The subquery is added to the combined query in a FROM clause.

The modifying clause received at receiving operation 308 includes an exemplary directive comprising two exemplary criteria. The first criterion, shown as criterion 204 in FIG. 2, contains a fragment of SQL code, "WHERE MANAGER='Smith' ". This criterion is added as the WHERE clause of the combined query.

The second criterion, shown as criterion 206 in FIG. 2, specifies, "ONLY COLUMNS DEPTNO AND DEPTNAME". Thus, the SELECT clause of the combined query is configured to select only the DEPTNO and DEPTNAME columns.

The modifying clause also includes an exemplary expression shown as expression 208 in FIG. 2. The expression specifies, "SORT BY DEPTNO". Thus, the ORDER BY clause of the combined query is configured to order by the DEPTNO field in ascending order.

In this example, the following combined query is generated:
SELECT DEPTNO, DEPTNAME
FROM (SELECT * FROM DEPARTMENT) AS RESULT
WHERE MANAGER='Smith'
ORDER BY DEPTNO ASC After generating operation 316 is completed, control passes to transmitting operation 318.

At transmitting operation 318, the combined query generated at generating operation 316 is transmitted to a database. Transmitting operation 318 may be performed by the server.

At receiving operation 320, the combined query transmitted at transmitting operation 318 is received at a database. After receiving operation 320 is completed, control passes to querying operation 322.

At querying operation 322, the combined query received at receiving operation 320 is executed at the database.

Many databases known in the art include a query planner. The query planner analyzes submitted queries to determine whether an optimized query exists which will return the same result as the submitted query but which will execute more efficiently. The database executing the combined query may employ a query planner to optimize the combined query.

At transmitting operation 324, the result of the combined query is transmitted by the database. In an embodiment of the present invention, the database transmits the result to the client computer which transmitted the request at transmitting operation 302.

In another embodiment of the present invention, the database transmits the result to a server which transmitted the combined query at transmitting operation 318. The server may perform additional filtering on the result. The server then retransmits the result to the client computer which transmitted the request at transmitting operation 302.

At receiving operation 326, the result of the combined query is received at the client computer which transmitted the request at transmitting operation 302. When receiving operation 326 is completed, processing of the request is complete.

Figure 4:
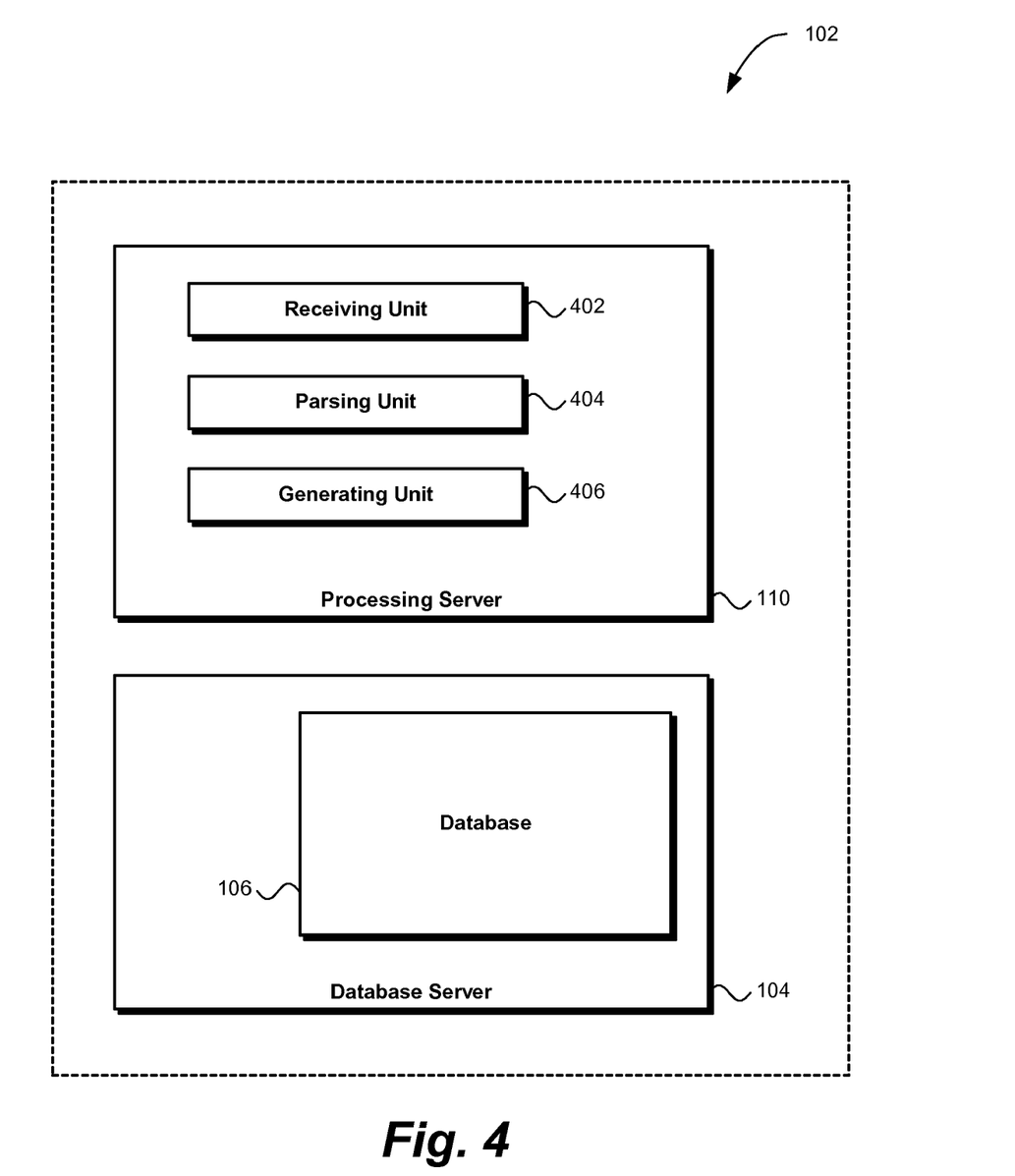
FIG. 4 illustrates additional detail about the processing server and the database in a system embodying the present invention.

Turning now to FIG. 4, additional detail about the processing server and the database in a system embodying the present invention is illustrated.

The processing server 110 comprises a receiving unit 402. The receiving unit is configured to receive an identifier of a base query from a client computer. The identifier of the base query may be of the type shown in FIG. 2. Thus, the identifier of the base query may have any or all of the properties discussed in regards to FIG. 2. Notably, the base query is configured to select a set of data records from a database that the client computer has permission to access. The receiving unit may perform the method steps listed in receiving operation 306 of FIG. 3 to receive the identifier of the base query.

The receiving unit 402 is further configured to receive a modifying clause from a client computer. The modifying clause may be of the type shown in FIG. 2. Thus, the modifying clause may have any or all of the properties discussed in regards to FIG. 2. Notably, the modifying clause may comprise a directive restricting the set of data records to a subset of data records. The receiving unit may perform the method steps listed in receiving operation 308 of FIG. 3 to receive the modifying clause.

The processing server 110 further comprises a parsing unit 404. The parsing unit is configured to parse the modifying clause according to a grammar defining a structured syntax and vocabulary. The grammar may be a Backus-Naur form. The parsing unit may perform the method steps listed in parsing operation 310 of FIG. 3 to parse the modifying clause.

The processing server 110 further comprises a generating unit 406. The generating unit is configured to generate a combined query from the base query specified by the identifier and the modifying clause. The query is configured to return the subset of data records specified by the modifying clause. The generating unit may perform the method steps listed in generating operation 316 of FIG. 3 to generate the combined query.

The database 106 is configured to execute the combined query generated by the generating unit 406. The database may be located at a database server 104.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for retrieving data records to a client computer, the method comprising:
    receiving a request from the client computer, the request including an identifier of a base query and a modifying clause, the base query configured to select a set of data records from a database that the client computer has permission to access, wherein the base query is not received from the client, the modifying clause comprising a directive restricting the set of data records to a subset of data records;
    generating a combined query from the base query and the modifying clause, the query configured to return the subset of data records; and
    executing the combined query at the database.

2. The method of claim 1, wherein:
    the directive further comprises a criterion to be satisfied by the subset of data records; and
    the combined query is configured to exclude from the subset of data records any data record for which the criterion is not satisfied.

3. The method of claim 2, wherein the criterion is satisfied only for data located at one or more specified fields in a relational data schema.

4. The method of claim 2, wherein the criterion is satisfied only for data located at one or more specified records in a relational data schema.

5. The method of claim 1, wherein the directive includes at least one dynamically generated, non-constant variable.

6. The method of claim 1, wherein:
    the modifying clause further comprises an expression; and
    the combined query is further configured to sort the subset of data records based on the value of the expression.

7. The method of claim 1, further comprising parsing the modifying clause according to a grammar defining a structured syntax and vocabulary.

8. A system for retrieving data records to a client computer, the system comprising:
    a server, the server comprising:
        a computer processor;
        a receiving unit configured to receive a request from the client computer, the request including an identifier of a base query and a modifying clause, the base query configured to select a set of data records from a database that the client computer has permission to access, the modifying clause comprising a directive restricting the set of data records to a subset of data records, wherein the base query is not received from the client; and
        a generating unit configured to generate a combined query from the base query and the modifying clause, the query configured to return the subset of data records;
    a database, the database configured to execute the combined query.

9. The system of claim 8, wherein:
    the directive further comprises a criterion to be satisfied by the subset of data records; and
    the combined query is configured to exclude from the subset of data records any data record for which the criterion is not satisfied.

10. The system of claim 8, wherein the directive is a non-constant.

11. The system of claim 8, wherein:
    the modifying clause further comprises an expression;
    the combined query is further configured to sort the subset of data records based on the value of the expression.

12. The system of claim 8, wherein the server further comprises a parsing unit configured to parse the modifying clause according to a grammar defining a structured syntax and vocabulary.

13. A computer program product embodied in non-transitory computer readable memory comprising:
    computer readable program codes coupled to the non-transitory computer readable memory for retrieving data records to a client computer, the computer readable program codes configured to cause the program to:
    receive a request from the client computer, the request including an identifier of a base query and a modifying clause, the base query configured to select a set of data records from a database that the client computer has permission to access, wherein the base query is not received from the client, the modifying clause comprising a directive restricting the set of data records to a subset of data records;
    generate a combined query from the base query and the modifying clause, the query configured to return the subset of data records; and
    execute the combined query at the database.

14. The computer program product of claim 13, wherein:
    the directive further comprises a criterion to be satisfied by the subset of data records; and
    the combined query is configured to exclude from the subset of data records any data record for which the criterion is not satisfied.

15. The computer program product of claim 14, wherein the criterion is satisfied only for data located at one or more specified fields in a relational data schema.

16. The computer program product of claim 14, wherein the criterion is satisfied only for data located at one or more specified records in a relational data schema.

17. The computer program product of claim 13, wherein the directive is a non-constant.

18. The computer program product of claim 13, wherein:
    the modifying clause further comprises an expression; and
    the combined query is further configured to sort the subset of data records based on the value of the expression.

19. The computer program product of claim 13, further comprising parsing the modifying clause according to a grammar defining a structured syntax and vocabulary.

20. The computer program product of claim 13, wherein the base query is coded in Structured Query Language.

* * * * *